United States Patent [19]

Conageski

[11] 4,277,331
[45] Jul. 7, 1981

[54] ONE-STAGE FLOTATION PURIFICATION OF NAOH

[75] Inventor: Raymond H. Conageski, Montague, Mich.

[73] Assignee: E. I. Du Pont de Nemours & Co., Wilmington, Del.

[21] Appl. No.: 48,590

[22] Filed: Jun. 14, 1979

[51] Int. Cl.³ .............................................. B03D 1/02
[52] U.S. Cl. .................................. 23/293 R; 209/164; 210/703
[58] Field of Search .................... 210/44, 56, 71, 177, 210/221 D; 23/293; 209/11, 164, 165

[56] References Cited

U.S. PATENT DOCUMENTS

| | | | |
|---|---|---|---|
| 1,430,182 | 9/1922 | Peck | 210/44 |
| 3,772,190 | 11/1973 | Eisenmann | 210/44 |
| 3,784,468 | 1/1974 | Garcia | 210/44 |
| 4,065,270 | 12/1977 | Nakaya et al. | 23/302 T X |

FOREIGN PATENT DOCUMENTS 5269895  6/1977  Japan.

OTHER PUBLICATIONS

Hubel et al., "Removal of Salt From Caustic Soda Produced By Diaphragm Cells", Canadian Chemistry and Metallurgy, p. 52 Mar., 1933.

Primary Examiner—William A. Cuchlinski, Jr.
Attorney, Agent, or Firm—F. J. Crowley; J. A. Costello

[57] ABSTRACT

A process for purifying an aqueous solution of NaOH by removing suspended NaCl and $Na_2SO_4$ impurities therefrom comprising bubbling a gas into the impurity-containing NaOH solution at a temperature above 16° C. and up to about 36° C.

7 Claims, 1 Drawing Figure

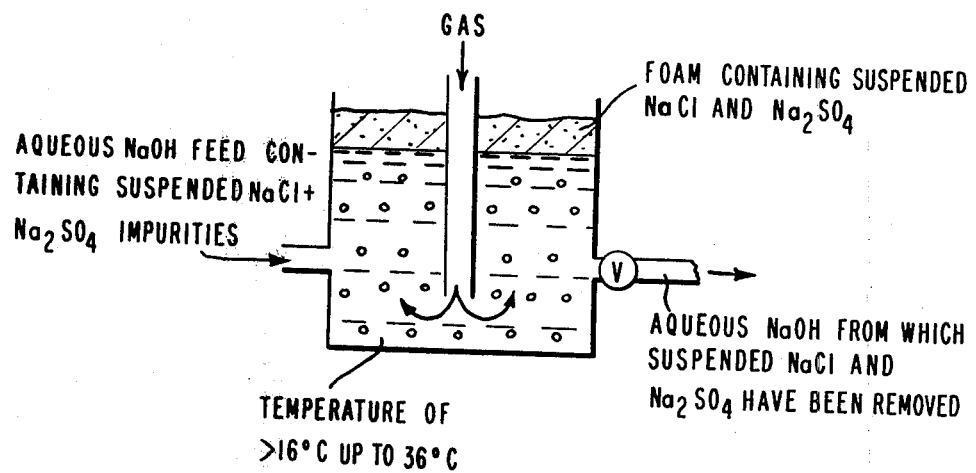

ONE-STAGE FLOTATION PURIFICATION OF NAOH

BACKGROUND OF THE INVENTION

This invention concerns a flotation purification system for removing suspended NaCl and Na$_2$SO$_4$ impurities from aqueous NaOH having a concentration of less than 52 percent by weight of NaOH. The process is well suited to purification of caustic soda manufactured by electrolysis of brine in cells utilizing diaphragm partitions.

It is known to remove suspended NaCl and Na$_2$SO$_4$ impurities from aqueous sodium hydroxide by filtration and by centrifugation. Filtration purification is a costly, difficult to operate procedure. Centrifugation is difficult to control because it is so sensitive to crystal size.

Purification of aqueous sodium hydroxide by flotation of NaCl has been disclosed in Japanese Patent Application 52-69895. However, that purification procedure relies on use of organic surface active agents and does not utilize the range of temperatures employed in the instant process. Use of organic surface active agents is undesirable because of the difficulty of removing them from recycled NaCl. They may damage cell anodes when returned with NaCl to the brine electrolysis cells. Furthermore, the surface active agents are impurities in the NaOH product.

U.S. Pat. No. 4,065,270 discloses the flotation separation of crystals of impurities from a slurry of sodium hydroxide hydrate crystals. The patent does not contemplate separation of impurity crystals from aqueous sodium hydroxide solution nor does it contemplate making use of the specific temperatures described herein. Production of sodium hydroxide hydrate crystals as taught by the patent is avoided in the process of this invention wherein such crystals would become entrained with those of the very impurities from which NaOH is desired to be separated.

SUMMARY OF THE INVENTION

This invention concerns a process for purifying an aqueous solution of less than 52 weight percent of NaOH by removing suspended NaCl and Na$_2$SO$_4$ impurities therefrom. The process comprises:

(i) bubbling a gas into the impurity-containing NaOH solution at a temperature above 16° C. up to and including about 36° C., said gas transporting the suspended impurities to the surface of the NaOH solution, the suspended impurities forming a surface foam layer on the NaOH solution; and (ii) separating the surface foam layer of impurities from the NaOH solution.

Substantially all of the suspended NaCl and most of the suspended Na$_2$SO$_4$ can be removed when the temperature employed is above 16° C. up to about 31° C. Substantially all of the suspended NaCl and Na$_2$SO$_4$ can be removed when the temperature employed is above 31° C. up to about 36° C. However, at a temperature of >31° C. up to about 36° C., the NaCl is more soluble than at the lower end of the temperature range. Therefore, although all suspended NaCl is removed at >31° to 36° C. the overall amount of NaCl in the aqueous NaOH may exceed that present after running at the lower end of the temperature range for a comparable time. Na$_2$SO$_4$ is more readily removed at >31° C. to 36° C. because, it is believed, the lower viscosity makes it easier for the gas to transport the Na$_2$SO$_4$ to the surface.

The "gas" employed to float the impurities to the surface can be any gas inert to the contents of the impurity-containing NaOH solution which it will contact. Preferred gases are air and nitrogen; most preferred is air. Preferred process conditions comprise an aqueous NaOH feed of from 45% to <52% NaOH and a temperature of 25° C. to 34° C.

BRIEF DESCRIPTION OF THE DRAWING

The FIGURE is a schematic flow diagram of a representative flotation purification system of this invention.

There are several alternative systems to accomplish the flotation purification depicted in the FIGURE. The alternatives will be readily apparent to one skilled in the art from the description provided herein. All of said systems are contemplated to fall within the scope of this invention. Alternatives include use of paddle skimmers or spillover decantation for removing foam impurities; turbulent gas entry, and the like.

Although, for the sake of simplicity, the FIGURE does not refer to foam-entrained NaOH, it will be appreciated that the surface foam layer will contain some aqueous NaOH, perhaps as much as 35% or more by weight. In any event, the surface foam layer will always be richer in impurities and leaner in NaOH than the underlying aqueous NaOH layer.

DETAILS OF THE INVENTION

There are several factors which affect purification of aqueous NaOH. For example, there is an NaOH concentration/temperature relationship. The concentration/temperature relationship makes it necessary that the aqueous NaOH feed be less than 52% by weight of NaOH. More concentrated than 52% and NaOH hydrate crystals might well form at the temperatures at which this process is designed to be run. The presence of NaOH hydrate crystals would lead to their entrainment with the NaCl and Na$_2$SO$_4$ impurities. Thus, the efficiency of the process would be seriously compromised.

Another important factor in appreciating the scope of this invention is that the disclosed process is most beneficially employed in a continuous process. In a batch process, time can be allocated to allow impurity crystals to settle. The supernatent aqueous NaOH would then be correspondingly free of the impurity. However, even if it were convenient to employ such a batch process with the relatively unproductive time required for settling impurities, there would remain the problem of recovering and discarding the impurity sediment.

The disclosed process although perfectly acceptable in a batch operation (including one in which settling of impurities takes place) is more efficiently utilized in a high throughput continuous operation. It is economically more attractive to collect foam impurity continuously from the top of a relatively small flotation vessel than to utilize relatively larger settling tanks from which sedimental impurities must be continuously purged to avoid hardcake formation with attendant removal problems.

The process of this invention will allow purification of aqueous NaOH to the extent that substantially all suspended impurities are removed. If desired, however, process times can be controlled, as will be obvious to those skilled in the art, so that less than all suspended impurities are removed.

Although not wishing to be bound by this hypothesis, it is believed that the process of this invention is related to solubility of the impurities and viscosity of the feed. At temperatures above 16° C. and up to 31° C., solubility and viscosity conditions are such that substantially all the suspended NaCl and most of the suspended $Na_2SO_4$ is transported to the surface by the gas which is introduced. At temperatures above 31° C. and up to 36° C. the viscosity conditions are such that suspended $Na_2SO_4$ is relatively easily transported to the surface. For example, equivalent amounts of suspended $Na_2SO_4$ would be more effectively transported to the surface at temperatures above 31° C. to 36° C. than at temperatures above 16° C. to 31° C. In the case of 50% caustic, the viscosity versus temperature curve is steep: viscosity at 35° C. being 28 cp and at 27° C. being 44 cp, a 36% difference.

The rate of gas introduction is related to the feed rate of the caustic. As will be obvious to one skilled in the art, the gas and caustic feed rates can be adjusted to attain relatively splash-free flotation with minimum NaOH entrainment. Gas and caustic feed rates can also be readily adjusted with a view to maintaining a certain level or depth of foam, say, per unit time or per pass of the skimmer paddle, etc. In any event, one skilled in the art, based on this disclosure, will have no difficulty in emplacing the disclosed purification process in any existing NaOH production process.

EXAMPLES

The following purification procedures were employed to remove suspended NaCl and $Na_2SO_4$ impurities in the flotation purification system of this invention.

EXAMPLES 1 and 2

Two identical 400 ml samples of aqueous NaOH were treated at room temperature as follows: The first sample was transferred to a 600 ml beaker and sparged with nitrogen for 3 hours at a moderate sparging rate. After sparging, the sample was allowed to remain stationary for 20 minutes before extracting 100 ml of sample from below the accumulated foam layer on the top.

The second sample was also transferred to a 600 ml beaker and sparged for 1 hour with nitrogen at a moderate sparging rate. After sparging, a 100 ml sample was immediately collected from under the foam layer. The results are summarized in Table 1.

TABLE 1

|  | Original Sample | Example 1 (3 hr Sparge) 20 min Settling | Example 2 (1 hr Sparge) (No Settling) |
|---|---|---|---|
| NaOH | 48.8% (by weight) | — | — |
| NaCl | 1.38% (by weight) | 1.0% | 1.12% |
| $Na_2SO_4$ | 1419 ppm (by weight) | 60 ppm | 858 ppm |

The lower NaCl and $Na_2SO_4$ values obtained in the first sample versus those obtained in the second sample are believed to result from (1) the additional time of sparging (3 hours v. 1 hour) and (2) the 20 minute settling time in the first sample which allowed suspended solids to collect on the bottom of the beaker.

The purification procedure followed for the second sample with its one hour sparge and no settling time approximates actual commercial NaOH plant operating conditions more closely than does the purification procedure followed for the first sample.

EXAMPLES 3 to 8

The following purifications of approximately 50% aqueous NaOH utilized a 20-gallon drum inside a 55-gallon drum. Caustic, reported in gallons per minute, was fed into the smaller drum about 6 inches from the bottom; air, reported in cubic feet per minute (cfm), was then sparged into this smaller drum. Air feed rate was measured with a rotameter. The larger drum provided overflow facilities and was fitted with a weir to remove foam as it separated. All temperatures were between 25° C. to 31° C. Results are summarized in Table 2.

TABLE 2

| Example No. | Feed (gpm) | Air (cfm) | Feed Sample NaCl | Feed Sample $Na_2SO_4$ | Product Sample NaCl | Product Sample $Na_2SO_4$ |
|---|---|---|---|---|---|---|
| 3 | 0.55 | 0.1 | 1.24 | 1966 | 1.11 | 1385 |
| 4 | 0.55 | 0.1 | 1.22 | 1749 | 1.11 | 1029 |
| 5[1] | 0.8 | 0.1 | 1.19 | 1866 | 1.13 | 1129 |
| 6[2] | 0.55 | 0.1 | 1.29 | 2324 | 1.08 | 463 |
| 7[3] | 0.11 | 0.1 | 1.29 | 2324 | 1.03 | 612 |
| 8 | Batch 5.4 gallons | 0.067 | 1.16 | 1577 | 1.09 | 1158 |

[1] 29° C.
[2] Three hour sparge followed by one-half hour settling; about 27° C.
[3] Two hour sparge, no settling.

The results summarized in Table 2 demonstrate the importance of even gas flow relatively well-spread out over the entire volume of the impurity-containing aqueous NaOH. In the absence of such controlled gas flow, poor separation efficiencies may result.

EXAMPLES 9 to 73

The following purifications were made in a twenty cubic foot, four cell, Denver Equipment Company pilot aeration-flotation unit, Model No. 5-6.5. Air was the gas employed. Table 3 lists air input in Standard cubic feet per minute (scfm). Aqueous NaOH feed is given in gallons per minute (gpm). The concentration of NaCl and NaOH is in percent by weight and the concentration of $Na_2SO_4$ is in parts per million (ppm) by weight. The temperature was between 25° C. to 31° C. in all instances. The numbered sets of data (wherein Examples 9 to 15 represent a set of data, Example 16 to 19 represent another set of data, etc.) were obtained at one hour intervals after conditions reached equilibrium. Feed concentrations of NaOH varied between about 46% to 50%. Concentrations of NaOH in the product samples closely approximated the concentrations of NaOH in the corresponding feed samples.

TABLE 3

| Ex. No. | Feed (gpm) | Air (scfm) | Feed Sample NaCl | Feed Sample $Na_2SO_4$ | Product Sample NaCl | Product Sample $Na_2SO_4$ |
|---|---|---|---|---|---|---|
| 9 | 12 | Not Measured | 1.30 | 1792 | 1.09 | 603 |
| 10 | 20.5 |  | ↓ | ↓ | 1.07 | 553 |
| 11 | 20.5 |  | ↓ | ↓ | 1.08 | 814 |
| 12 | 12 |  | ↓ | ↓ | 1.09 | 462 |
| 13 | 28 |  | ↓ | ↓ | 1.10 | 676 |
| 14 | 6.5 |  | ↓ | ↓ | 1.09 | 220 |
| 15 | 20.5 |  | ↓ | ↓ | 1.10 | 561 |
| 16 | 12 | Not Measured | 1.28 | 2068 | 1.09 | 589 |
| 17 | 10 |  | ↓ | ↓ | 1.10 | 380 |
| 18 | 10 |  | ↓ | ↓ | 1.10 | 205 |
| 19 | 6.5 |  | ↓ | ↓ | 1.14 | 183 |
| 20 | 11.5 | 2.55 | 1.28 | 2051 | 1.11 | 620 |
| 21 | 11.5 | 3.83 | ↓ | ↓ | 1.10 | 561 |
| 22 | 11.5 | 5.10 | ↓ | ↓ | 1.09 | 572 |
| 23 | 11.5 | 6.38 | ↓ | ↓ | 1.11 | 557 |
| 24 | 11.5 | 8.30 | 1.25 | 1940 | 1.09 | 463 |
| 25 | 11.5 | 11.48 | 1.25 | 1940 | 1.10 | 543 |

TABLE 3-continued

| Ex. No. | Feed (gpm) | Air (scfm) | Feed Sample NaCl | Feed Sample Na₂SO₄ | Product Sample NaCl | Product Sample Na₂SO₄ |
|---|---|---|---|---|---|---|
| 26 | 11.5 | 5.74 | 1.23 | 1487 | 1.11 | 537 |
| 27 | 11.5 | 5.74 | ↓ | ↓ | 1.11 | 197 |
| 28 | 12 | 5.74 | ↓ | ↓ | 1.10 | 240 |
| 29 | 12 | 5.74 | ↓ | ↓ | 1.10 | 578 |
| 30 | 12 | 8.55 | ↓ | ↓ | 1.08 | 521 |
| 31 | 12 | 8.55 | ↓ | ↓ | 1.16 | 545 |
| 32 | 16 | 8.55 | ↓ | ↓ | 1.08 | 602 |
| 33 | 16 | 8.55 | ↓ | ↓ | — | — |
| 34 | 16 | 5.74 | ↓ | ↓ | 1.11 | 835 |
| 35 | 12 | 2.5 | 1.42 | 1687 | 1.26 | 781 |
| 36 | 12 | 2.5 | ↓ | ↓ | 1.21 | 676 |
| 37 | 12 | 1.3 | ↓ | ↓ | 1.19 | 829 |
| 38 | 16 | 1.3 | ↓ | ↓ | 1.18 | 890 |
| 39 | 5 | 1.3 | ↓ | ↓ | 1.45 | 720 |
| 40 | 5 | 1.3 | ↓ | ↓ | 1.27 | 470 |
| 41 | 5 | 2.5 | ↓ | ↓ | 1.21 | 409 |
| 42 | 20 | 6.4 | 1.29 | 1515 | 1.09 | 575 |
| 43 | 15 | 6.4 | ↓ | ↓ | — | — |
| 44 | 15 | 6.4 | ↓ | ↓ | — | — |
| 45 | 15 | 3.8 | ↓ | ↓ | — | — |
| 46 | 15 | 2.6 | ↓ | ↓ | — | — |
| 47 | 15 | 1.3 | ↓ | ↓ | 1.12 | 725 |
| 48 | 12 | 2.5 | 1.28 | 2015 | 1.13 | 627 |
| 49 | 12 | 1.3 | ↓ | ↓ | 1.10 | 656 |
| 50 | 16 | 1.3 | ↓ | ↓ | 1.11 | 971 |
| 51 | 5 | 1.3 | ↓ | ↓ | 1.10 | 589 |
| 52 | 12 | 1.9 | ↓ | ↓ | 1.11 | 762 |
| 53 | 12 | 2.5 | ↓ | ↓ | 1.11 | 483 |
| 54 | 8 | 6.4 | 2.89 | 3973 | 1.09 | 578 |
| 55 | 8 | 3.8 | ↓ | ↓ | 1.10 | 666 |
| 56 | 8 | 3.8 | ↓ | ↓ | 1.09 | 681 |
| 57 | 5 | 3.8 | ↓ | ↓ | 1.07 | 424 |
| 58 | 12 | 3.8 | 1.35 | 2358 | 1.09 | 794 |
| 59 | 12 | 3.8 | ↓ | ↓ | 1.08 | 541 |
| 60 | 12 | 3.8 | ↓ | ↓ | 1.08 | 581 |
| 61 | 12 | 3.8 | ↓ | ↓ | 1.06 | 681 |
| 62 | 12 | 3.8 | ↓ | ↓ | 1.07 | 614 |
| 63 | 5 | 2.5 | 2.56 | 3961 | 1.14 | 517 |
| 64 | 5 | 2.5 | ↓ | ↓ | 1.09 | 528 |
| 65 | 5 | 2.5 | ↓ | ↓ | 1.07 | 407 |
| 66 | 5 | 2.5 | ↓ | ↓ | 1.07 | 532 |
| 67 | 5 | 2.5 | ↓ | ↓ | 1.09 | 543 |
| 68 | 5 | 2.5 | 2.48 | 3926 | 1.09 | 535 |
| 69 | 5 | 2.5 | 3.04 | 7660 | 1.16 | 619 |
| 70 | 5 | 2.5 | ↓ | ↓ | 1.09 | 480 |
| 71 | 5 | 2.5 | 1.98 | 2054 | 1.13 | 433 |
| 72 | 5 | 2.5 | ↓ | ↓ | 1.12 | 598 |
| 73 | 5 | 2.5 | ↓ | ↓ | 1.11 | 414 |

EXAMPLES 74 to 86

The Examples summarized in Table 4, below, were run at 34° to 35° C.

TABLE 4

| Example No. | Feed (gpm) | Air (scfm) | Feed Sample NaCl | Feed Sample Na₂SO₄ | Product Sample NaCl | Product Sample Na₂SO₄ |
|---|---|---|---|---|---|---|
| 74 | 5 | 2.5 | 1.31 | 1657 | 1.14 | <60 |
| 75 | 5 | 2.5 | ↓ | ↓ | 1.17 | <60 |
| 76 | 5 | 2.5 | ↓ | ↓ | 1.13 | 79 |
| 77 | 5 | 2.5 | ↓ | ↓ | 1.13 | 175 |
| 78 | 5 | 2.5 | ↓ | ↓ | 1.16 | 77 |
| 79 | 5 | 2.5 | ↓ | ↓ | 1.12 | 147 |
| 80 | 5 | 2.5 | 2.83 | 3800 | 1.20 | 581 |
| 81 | 5 | 2.5 | ↓ | ↓ | 1.18 | 459 |
| 82 | 5 | 2.5 | ↓ | ↓ | 1.23 | 396 |
| 83 | 5 | 2.5 | ↓ | ↓ | 1.20 | 450 |
| 84 | 5 | 2.5 | 2.50 | 4100 | 1.19 | 367 |
| 85 | 5 | 2.5 | 1.23 | 2027 | 1.09 | 371 |
| 86 | 5 | 2.5 | 1.22 | 1729 | 1.10 | <60 |

The embodiments of the invention in which an exclusive property or privilege is claimed are defined as follows:

1. A process for purifying an aqueous solution containing less than 52 weight percent of NaOH by removing suspended NaCl and Na₂SO₄ impurities, comprising:
   (i) bubbling a gas into the impurity-containing NaOH solution at a temperature above 16° C. up to about 36° C., to transport suspended impurities to the surface of the NaOH solution and form a surface foam layer on the NaOH solution; and
   (ii) separating the surface foam layer of impurities from the NaOH solution.

2. A process according to claim 1 wherein the temperature is about 25° C. to 34° C.

3. A process according to claim 2 wherein the aqueous NaOH has a concentration of about 45% to <52% and the gas is air or nitrogen.

4. A process according to claim 3 wherein the gas is air.

5. A process according to claim 1 wherein the aqueous NaOH has a concentration of about 45% to <52%.

6. A process according to claim 1 wherein the gas is air or nitrogen.

7. A process according to claim 6 wherein the gas is air.

* * * * *